(12) United States Patent
Iyer et al.

(10) Patent No.: US 10,977,073 B2
(45) Date of Patent: Apr. 13, 2021

(54) ARCHITECTURAL DATA MOVER FOR RAID XOR ACCELERATION IN A VIRTUALIZED STORAGE APPLIANCE

(71) Applicant: Dell Products L.P., Round Rock, TX (US)

(72) Inventors: Shyam T. Iyer, Austin, TX (US); Srikrishna Ramaswamy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 97 days.

(21) Appl. No.: 16/507,587

(22) Filed: Jul. 10, 2019

(65) Prior Publication Data
US 2021/0011750 A1  Jan. 14, 2021

(51) Int. Cl.
G06F 9/455 (2018.01)
G06F 9/50 (2006.01)
G06F 3/06 (2006.01)

(52) U.S. Cl.
CPC ........ *G06F 9/45558* (2013.01); *G06F 3/0604* (2013.01); *G06F 3/067* (2013.01); *G06F 3/0656* (2013.01); *G06F 3/0664* (2013.01); *G06F 9/5027* (2013.01); *G06F 2003/0697* (2013.01); *G06F 2009/45579* (2013.01); *G06F 2009/45583* (2013.01); *G06F 2009/45595* (2013.01)

(58) Field of Classification Search
CPC .. G06F 9/45558; G06F 3/0604; G06F 3/0656; G06F 3/0664; G06F 3/067; G06F 2009/45579; G06F 2009/45583; G06F 2009/45595
See application file for complete search history.

(56) References Cited

U.S. PATENT DOCUMENTS

| | | | | |
|---|---|---|---|---|
| 5,960,169 | A * | 9/1999 | Styczinski | G06F 11/1076 711/114 |
| 5,996,046 | A * | 11/1999 | Yagisawa | G06F 11/1076 711/112 |
| 2014/0173017 | A1* | 6/2014 | Takagi | G06F 3/0685 709/213 |
| 2014/0351809 | A1* | 11/2014 | Chawla | G06F 3/0665 718/1 |
| 2015/0378636 | A1* | 12/2015 | Yadav | G06F 3/0652 711/165 |

* cited by examiner

*Primary Examiner* — Diem K Cao
(74) *Attorney, Agent, or Firm* — Baker Botts L.L.P.

(57) ABSTRACT

Systems and methods for I/O acceleration in a virtualized system include receiving, at a hypervisor from an application executing under a guest OS, a request to write new data to a RAID system, redirecting the request to the VSA owning the RAID drives, moving the new data from guest OS physical address space to VSA physical address space, preparing, by a RAID driver in the VSA, the new data for writing according to a RAID redundancy policy, reading, by the RAID driver into a first buffer, old data and old parity information, performing, by an architectural data mover, inline XOR copy operations to compute a difference between the old and new data, compute new parity information, and write the difference and new parity information into the second buffer, and writing, by the RAID driver, the difference and new parity information to the RAID system using the redundancy policy.

20 Claims, 6 Drawing Sheets

ARCHITECTURAL DATA MOVER FOR RAID XOR ACCELERATION IN A VIRTUALIZED STORAGE APPLIANCE

BACKGROUND

Field of the Disclosure

This disclosure relates generally to virtualized information handling systems and more particularly to an architectural data mover for input/output acceleration in a virtualized storage appliance.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

Often, virtualized architectures may be employed for numerous reasons, such as, but not limited to: (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and (5) encapsulation of complex configurations into a file that is easily replicated and provisioned, among other reasons. As noted above, the information handling system may include one or more operating systems, for example, executing as guest operating systems in respective virtual machines.

An operating system serves many functions, such as controlling access to hardware resources and controlling the execution of application software. Operating systems also provide resources and services to support application software. These resources and services may include data storage, support for at least one file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

The information handling system may include multiple processors connected to various devices, such as Peripheral Component Interconnect ("PCI") devices and PCI express ("PCIe") devices. The operating system may include one or more drivers configured to facilitate the use of the devices. As mentioned previously, the information handling system may also run one or more virtual machines, each of which may instantiate a guest operating system. Virtual machines may be managed by a virtual machine manager, such as, for example, a hypervisor. Certain virtual machines may be configured for device pass-through, such that the virtual machine may utilize a physical device directly without requiring the intermediate use of operating system drivers.

Conventional virtualized information handling systems may benefit from increased performance of virtual machines. Improved performance may also benefit virtualized systems where multiple virtual machines operate concurrently. Applications executing under a guest OS in a virtual machine may also benefit from higher performance from certain computing resources, such as storage resources.

SUMMARY

In one aspect, a disclosed method is for input/output acceleration in a virtualized information handling system. The method includes receiving, at a disk layer of a hypervisor executing in the virtualized information handling system from an application executing under a guest operating system (OS) in a virtual machine, a request to write new data to a redundant array of independent disks (RAID) system including a plurality of disk drives, redirecting the request to a virtualized storage appliance (VSA) that owns the plurality of disk drives, moving the new data from a physical address space of the guest OS to a physical address space of the virtualized storage appliance, preparing, by a RAID driver in the virtualized storage appliance, the new data for writing to the RAID system at target addresses in the physical address space of the virtualized storage appliance in accordance with an applicable redundancy policy, reading, by the RAID driver into a first buffer in a system memory of the virtualized information handling system, old data stored at the target addresses and old parity information associated with the old data, performing, by an architectural data mover associated with a processor subsystem of the virtualized information handling system, inline exclusive-or (XOR) copy operations to compute a difference between the old data stored in the first buffer and the new data, write the difference into a second buffer in the system memory, compute new parity information based on the difference, and write the new parity information into the second buffer, and writing, by the RAID driver, the difference and the new parity information from the second buffer to the RAID system at the target addresses in the physical address space of the virtualized storage appliance in accordance with the applicable redundancy policy.

In any of the disclosed embodiments, the method further may further include, prior to receiving the request, writing the new data to a third buffer in the system memory and the inline exclusive-or (XOR) copy operations may be performed using the new data stored in the third buffer and the old data stored in the first buffer.

In any of the disclosed embodiments, preparing the new data for writing to the RAID system may include partitioning the new data into multiple data chunks to be written to respective ones of the plurality of disk drives in accordance with a data striping scheme defined by the applicable redundancy policy.

In any of the disclosed embodiments, the architectural data mover may be a Peripheral Component Interconnect Express (PCIe) device attached to the processor subsystem using a PCIe driver, and the method may further include receiving, by the architectural data mover from the processor subsystem, an instruction to initiate performance of the inline exclusive-or (XOR) copy operations.

In any of the disclosed embodiments, moving the new data from the physical address space of the guest OS to the physical address space of the virtualized storage appliance may be performed by the architectural data mover or by an alternate data mover.

In another aspect, an information handling system includes a processor subsystem, and a memory subsystem storing program instructions executable by the processor subsystem to implement a virtual machine on which an application executes under a guest operating system (OS), a virtualized storage appliance that owns a plurality of disk drives of a redundant array of independent disks (RAID) system, and a hypervisor. The hypervisor is configured to receive, at a disk layer of the hypervisor from the application, a request to write new data to the RAID system and to redirect the request to the virtualized storage appliance. The program instructions are further executable by the processor subsystem to implement a RAID driver in the virtualized storage appliance configured to prepare the new data for writing to the RAID system at target addresses in the physical address space of the virtualized storage appliance in accordance with an applicable redundancy policy and to read into a first buffer in the memory subsystem, old data stored at the target addresses and old parity information associated with the old data. The program instructions are further executable by the processor subsystem to implement an architectural data mover associated with the processor subsystem and configured to perform inline exclusive-or (XOR) copy operations to compute a difference between the old data stored at the target addresses and the new data, write the difference into a second buffer in the memory subsystem, compute new parity information based on the difference, and write the new parity information into the second buffer. The RAID driver is further configured to write the difference and the new parity information from the second buffer to the RAID system at the target addresses in the physical address space of the virtualized storage appliance in accordance with the applicable redundancy policy.

In any of the disclosed embodiments, the application may be configured to write the new data to a third buffer in the memory subsystem prior to the hypervisor receiving the request, and the inline exclusive-or (XOR) copy operations may be performed using the new data stored in the third buffer and the old data stored in the first buffer.

In any of the disclosed embodiments, to prepare the new data for writing to the RAID system, the RAID driver may be configured to partition the new data into multiple data chunks to be written to respective ones of the plurality of disk drives in accordance with a data striping scheme defined by the applicable redundancy policy.

In any of the disclosed embodiments, the architectural data mover may be a Peripheral Component Interconnect Express (PCIe) device attached to the processor subsystem using a PCIe driver, and the architectural data mover may be further configured to receive, from the processor subsystem, an instruction to initiate performance of the inline exclusive-or (XOR) copy operations.

In any of the disclosed embodiments, the information handling system may further include an input/output accelerator implemented in a field programmable gate array (FPGA) and configured to accelerate reading the old data stored at the target addresses and the old parity information associated with the old data into the first buffer.

In any of the disclosed embodiments, the architectural data mover may reside in the processor subsystem and may perform the inline exclusive-or (XOR) copy operations asynchronously and without processor intervention following initiation of the inline exclusive-or (XOR) copy operations by the processor subsystem.

In any of the disclosed embodiments, the architectural data mover may reside outside the processor subsystem and may include a field programmable gate array (FPGA), application-specific integrated circuit (ASIC), or graphics progressing unit (GPU) programmable by the processor subsystem.

In any of the disclosed embodiments, the architectural data mover may be configured to move data between any two of a virtual address space of the guest OS, the physical address space of the guest OS, a virtual address space of the virtual machine, a physical address space of the virtual machine, a virtual address space of the hypervisor, a physical address space of the hypervisor, a virtual address space of the VSA, and the physical address space of the VSA.

In any of the disclosed embodiments, the architectural data mover may be a Peripheral Component Interconnect Express (PCIe) device including respective PCIe functions assigned to two or more of the processor subsystem, the hypervisor, the virtual machine, and the virtualized storage appliance.

In any of the disclosed embodiments, the applicable redundancy policy may define a data striping scheme including block-level striping of data across multiple ones of the plurality of disk drives and a distribution of parity information across multiple ones of the plurality of disk drives.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Current virtual information handling systems may demand higher performance from computing resources, such as storage resources used by applications executing under guest operating systems. Many virtualized server platforms may desire to provide storage resources to such applications in the form of software executing on the same server where the applications are executing, which may offer certain advantages by bringing data closest to the application. Such software-defined storage may further enable new technologies, such as, but not limited to: (1) flash caches and cache networks using solid state devices (SSD) to cache storage operations and data; (2) virtual storage area networks (SAN); and (3) data tiering by storing data across local storage resources, SAN storage, and network storage, depending on I/O load and access patterns. Server virtualization has been a key enabler of software-defined storage by enabling multiple workloads to run on a single physical machine. Such workloads also benefit by provisioning storage resources closest to the application accessing data stored on the storage resources.

Storage software providing such functionality may interact with multiple lower level device drivers. For example: a layer on top of storage device drivers may provide access to server resident hard drives, flash SSD drives, non-volatile memory devices, and/or SAN storage using various types of interconnect fabric, (i.e., iSCSI, Fibre Channel, Fibre Channel over Ethernet, etc.). In another example, a layer on top of network drivers may provide access to storage software running on other server instances (i.e., access to a cloud). Such driver-based implementations have been challenging from the perspective of supporting multiple hypervisors and delivering adequate performance. Certain hypervisors in use today may not support third-party development of drivers, which may preclude an architecture based on optimized filter drivers in the hypervisor kernel. Other hypervisors may have different I/O architectures and device driver models, which may present challenges to developing a unified storage software for various hypervisor platforms.

Another solution is to implement the storage software as a virtual machine with pass-through access to physical storage devices and resources. However, such a solution may face serious performance issues when communicating with applications executing on neighboring virtual machines, due to low data throughput and high latency in the hypervisor driver stack. Thus, even though the underlying storage resources may deliver substantially improved performance, such as flash caches and cache networks, the performance advantages may not be experienced by applications in the guest OS using typical hypervisor driver stacks.

As will be described in further detail, systems and methods for input/output acceleration in a virtualized information handling system may include receiving, at a disk layer of a hypervisor executing in the virtualized information handling system from an application executing under a guest operating system (OS) in a virtual machine, a request to write new data to a redundant array of independent disks (RAID) system including a plurality of disk drives and redirecting the request to a virtualized storage appliance (VSA) that owns the plurality of disk drives. The methods may include moving the new data from a physical address space of the guest OS to a physical address space of the virtualized storage appliance. A RAID driver in the virtualized storage appliance may prepare the new data for writing to the RAID system at target addresses in the physical address space of the virtualized storage appliance in accordance with an applicable redundancy policy. The RAID driver may read into a first buffer in a system memory of the virtualized information handling system old data stored at the target addresses and old parity information associated with the old data, after which an architectural data mover associated with a processor subsystem of the virtualized information handling system may perform inline exclusive-or (XOR) copy operations to compute a difference between the old data stored in the first buffer and the new data, to write the difference into a second buffer in the system memory, to compute new parity information based on the difference, and to write the new parity information into the second buffer. The RAID driver may then write the difference and the new parity information from the second buffer to the RAID system at the target addresses in the physical address space of the virtualized storage appliance in accordance with the applicable redundancy policy.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, in some embodiments the information handling systems described herein may be or include a personal computing device, such as a personal computer, a desktop computer, a laptop computer, a notebook computer a PDA, a consumer electronic device, or another suitable device operated by a user. In other embodiments, an information handling system may represent a mainframe computer, such as a computer operating as a server or configured for shared use by multiple concurrent users, a network storage device, or another suitable device. Information handling systems may vary in size, shape, performance, functionality, and price, in different embodiments. An information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor described in more detail below may comprise firmware. As used in this disclosure, the term "firmware" may refer to software embedded in an information handling system component used to perform predefined tasks. Firmware is commonly stored in non-volatile memory, or memory that does not lose stored data upon the loss of power. In certain embodiments, firmware associated with an information handling system component may be stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, 4A, 4B, and 5 wherein like numbers are used to indicate like and corresponding parts.

Figure 1:
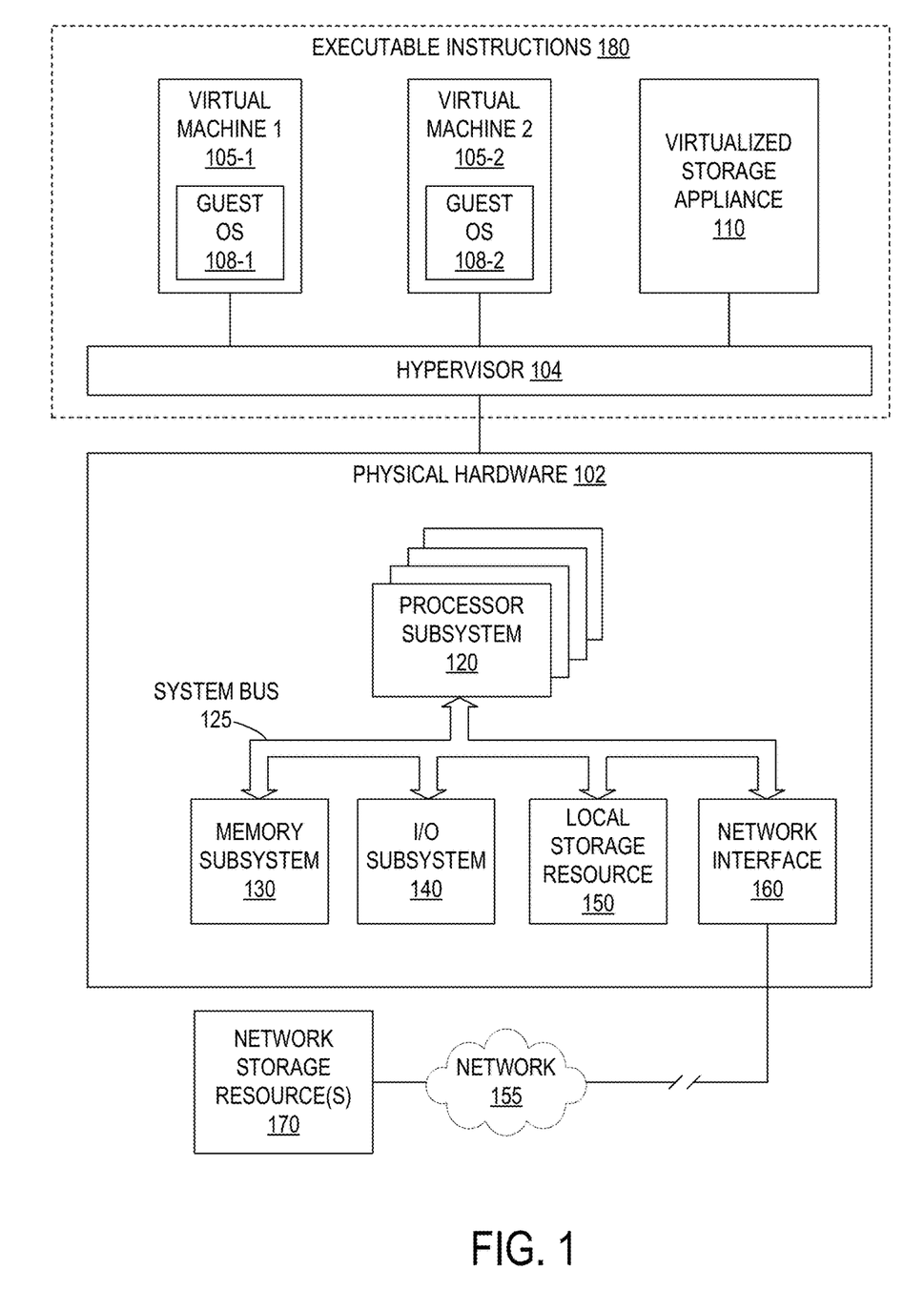
FIG. 1 is a block diagram of selected elements of an embodiment of an information handling system, as described herein.

Referring now to the drawings, FIG. 1 illustrates a block diagram depicting selected elements of an embodiment of an information handling system 100, in accordance with some embodiments. As depicted in FIG. 1, information handling system 100 may include physical hardware 102, executable instructions 180 (including a hypervisor 104, one or more virtual machines 105, and a virtualized storage appliance 110). Also shown with information handling system 100 are external or remote elements, namely, network 155 and network storage resource(s) 170.

As shown in FIG. 1, components of information handling system 100 may include, but are not limited to, processor subsystem 120, which may comprise one or more processors, and system bus 125 that communicatively couples various system components to processor subsystem 120 including, for example, a memory subsystem 130, an I/O subsystem 140, local storage resource 150, and a network interface 160. System bus 125 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCIexpress (PCIe) bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling information handling system 100 to communicate over network 155 using a suitable transmission protocol or standard, including, but not limited to, transmission protocols or standards enumerated below with respect to the discussion of network 155. In some embodiments, network interface 160 may be communicatively coupled via network 155 to network storage resource 170. The network 155 coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages (generally referred to as data). The network 155 coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (i SCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network 155 coupled to network interface 160 various components associated therewith may be implemented using hardware, software, or any combination thereof.

As depicted in FIG. 1, processor subsystem 120 may include a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and execute program instructions or process data stored locally (e.g., in memory subsystem 130 or local storage resource 150). In the same or alternative embodiments, processor subsystem 120 may interpret and execute program instructions or process data stored remotely (e.g., in network storage resources 170).

As shown in FIG. 1, memory subsystem 130 may include a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power is removed. Local storage resource 150 may include computer-readable media (e.g., hard disk drive, floppy disk drive, CD-ROM, and/or other type of rotating storage media, flash memory, EEPROM, and/or another type of solid-state storage media) and may be generally operable to store instructions and data and to permit access to stored instructions and data on demand. Likewise, network storage resources 170 may include computer-readable media (e.g., hard disk drive, floppy disk drive, CD-ROM, or other type of rotating storage media, flash memory, EEPROM, or other type of solid-state storage media) and may be generally operable to store instructions and data. In at least some embodiments, local storage resource 150 or network storage resources 170 may include a collection or array of storage devices and a storage controller. In some embodiments, information handling system 100 may have a redundant array of independent disks (RAID) installed thereon. For example, local storage resource 150 or network storage resource 170 may include a RAID system, in certain embodiments.

In information handling system 100, I/O subsystem 140 may include a system, device, or apparatus generally operable to receive and transmit data to or from or within information handling system 100. I/O subsystem 140 may represent, for example, any one or more of a variety of communication interfaces, graphics interfaces, video interfaces, user input interfaces, and peripheral interfaces. In some embodiments, I/O subsystem 140 may include an I/O accelerator device for accelerating data transfers between virtualized storage appliance 110 and guest OS 108, as described herein.

In at least some embodiments, information handing system 100 may also include one or more power control modules and one or more power supply units (not shown in FIG. 1).

In FIG. 1, hypervisor 104 may comprise software and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and/or as firmware running on physical hardware 102), also referred to as device passthrough, such that the virtual machine may utilize a physical device directly without requiring the intermediate use of operating system drivers. As a further alternative, the virtualization application of hypervisor 104 may, on various levels, interact directly with physical hardware 102 (e.g., similar to the way the OS interacts directly with physical hardware 102, and/or as firmware running on physical hardware 102) without utilizing the OS, although still interacting with the OS to coordinate use of physical hardware 102.

As shown in FIG. 1, virtual machine 1 105-1 may represent a host for guest OS 108-1, while virtual machine 2 105-2 may represent a host for guest OS 108-2. To allow multiple operating systems to be executed on information handling system 100 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. The virtualized hardware representation presented to each of virtual machines 105 may comprise a mutually exclusive or non-overlapping set of hardware resources per virtual machine 105 or may comprise an overlapping set of hardware resources per virtual machine 105 (e.g., one or more hardware resources may be shared by two or more virtual machines 105).

In one embodiment, hypervisor 104 may assign hardware resources of physical hardware 102 statically, such that certain hardware resources are assigned to certain virtual machines and this assignment does not vary over time. Additionally, or alternatively, hypervisor 104 may assign hardware resources of physical hardware 102 dynamically, such that the assignment of hardware resources to virtual machines varies over time, for example, in accordance with the specific needs of the applications running on the individual virtual machines. Additionally, or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, each of virtual machines 105 may respectively include a guest operating system (guest OS) 108, along with any applications or other software (not shown) running on guest OS 108. Each guest OS 108 may represent an OS compatible with and supported by hypervisor 104, even when guest OS 108 is generally incompatible with physical hardware 102. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-2 may comprise a MICROSOFT WINDOWS OS, while another guest OS on another virtual machine (not shown) may comprise a VXWORKS OS. Although information handling system 100 is depicted as having two virtual machines 105-1, 105-2, and one virtualized storage appliance 110, it will be understood that, in particular embodiments, different numbers of virtual machines 105 may be executing on information handling system 100 at any given time.

In FIG. 1, virtualized storage appliance 110 may represent storage software executing on hypervisor 104. Although virtualized storage appliance 110 may be implemented as a virtual machine and may execute in a similar environment and address space as described above with respect to virtual machines 105, virtualized storage appliance 110 may be dedicated to providing access to storage resources to instances of guest OS 108. Thus, virtualized storage appliance 110 may not itself be a host for a guest OS that is provided as a resource to users but may be an embedded feature of information handling system 100. It will be understood, however, that virtualized storage appliance 110 may include an embedded virtualized OS (not shown) similar to various implementations of guest OS 108 described previously herein. In particular, virtualized storage appliance 110 may enjoy pass-through device access to various devices and interfaces for accessing storage resources (local and/or remote). In some embodiments, virtualized storage appliance 110 may be enabled to provide logical communication connections between desired storage resources and guest OS 108 using an I/O accelerator device included in I/O subsystem 140. This may provide very high data throughput rates and very low latency transfer operations while subjecting processor subsystem 120 to minimal workload. As described in more detail herein, in some embodiments, virtualized storage appliance 110 may be or include a RAID appliance virtual machine.

In operation of system 100 shown in FIG. 1, hypervisor 104 of information handling system 100 may virtualize the hardware resources of physical hardware 102 and present virtualized computer hardware representations to each of virtual machines 105. Each guest OS 108 of a virtual machine 105 may then begin to operate and run applications and/or other software (not shown in FIG. 1). While operating, each guest OS 108 may utilize one or more hardware resources of physical hardware 102 assigned to the respective virtual machine by hypervisor 104. Each guest OS 108 and/or application executing under guest OS 108 may be presented with storage resources that are managed by virtualized storage appliance 110. In other words, virtualized storage appliance 110 may be enabled to mount and partition various combinations of physical storage resources, including local storage resources and remote storage resources, and present these physical storage resources as desired logical storage devices for access by guest OS 108. In some embodiments, virtualized storage appliance 110 may be enabled to use an I/O accelerator device, which may be a PCIe device represented by I/O subsystem 140 in FIG. 1, for access to storage resources by applications executing under guest OS 108 of virtual machine 105. In some embodiments, the I/O accelerator device may be implemented in a field programmable gate array (FPGA). In various embodiments, the features of virtualized storage appliance 110 described herein may further allow for implementation in a manner that is independent, or largely independent, of any particular implementation of hypervisor 104.

RAID data storage virtualization technology combines multiple physical disk drives into logical units for purposes of data redundancy and/or performance. Data is distributed across the disk drives using one of several data distribution schemes depending on the required level of redundancy and performance. For example, using the RAID level 0 scheme, data is distributed across multiple drives using striping, but no mirroring or parity function is implemented. By contrast, the RAID level 5 scheme includes block-level striping with parity information also being distributed among the drives.

In many existing information handling systems that include a RAID system that adheres to the RAID level 5 redundancy policy and the data striping scheme defined by RAID 5, the software that manages accesses to the RAID system may use a large number of CPU XOR instructions to compute write deltas and associated parity data. For example, in a typical system that implements RAID 5, writing new data to the RAID system may include the following operations:

1. Write new data into a system buffer X on behalf of an application.
2. A RAID driver stripes the new data in buffer X into two stripes X1 and X2 for transfer to two disk drives of the RAID system, e.g., a drive A and a drive B.
3. The RAID driver reads two stripes of old data at the target addresses on drives A and B into system buffers Y1 and Y2.
4. The difference between the old data and the new data is computed as a write delta, where write delta=(new data) XOR (old data). This computation involves large numbers of CPU intensive memory-to-memory copy operations, each of which operates on a sector size chunk (e.g., 512 bytes or 4K bytes) using CPU XOR instructions. For example, to operate on a 512-byte sector source, the source data may be broken into sixteen, 32-bit XOR data values.
5. The old parity associate with the old data is read from a drive C.
6. New parity information is computed as new parity= (write delta) XOR (old parity). This computation also involves large numbers of CPU intensive memory-to-memory copy operations, each of which operates on a sector size chunk (e.g., 512 bytes or 4K bytes) using CPU XOR instructions.
7. The new data to respective strips on drives A and B.
8. The new parity information is written to drive C.

In these existing systems, the memory-to-memory operations described above may be implemented in extremely time-consuming loops in which fragmented source data (e.g., old data) may be scatter-gathered into buffer lists, XOR'd with new data, and then copied into destination buffer lists. While CPUs can be efficient for manipulating small data payloads, they are typically not very efficient when performing large memory data set manipulation and transfers. In addition, advantages normally associated with CPU memory caching may fade when faced with scattered-gathered lists.

Many storage implementations require a storage library such as ISA-L or SPDK implemented in Linux user space stacks. However, storage stacks built on these libraries cannot be supported or integrated into hypervisor kernels. Therefore, many virtualized storage stacks are implemented within a VSA for practicality. Existing data movers that support inline XOR copy operations are unable to operate on guest OS physical addresses. However, the architectural data movers described herein may support virtualized storage stacks.

Figure 2:
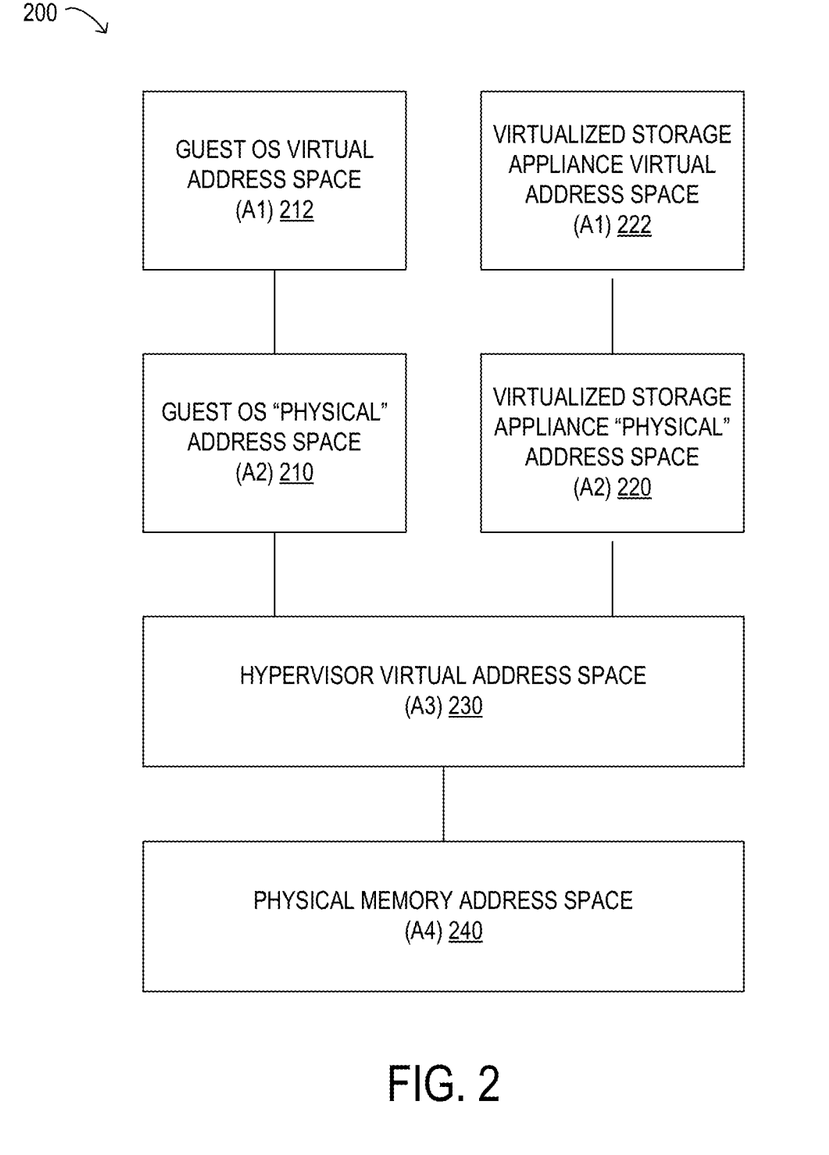
FIG. 2 is a block diagram of selected elements of a memory space in a virtualized computing environment, in accordance with some embodiments.

FIG. 2 is a block diagram of selected elements of a memory space 200 in a virtualized computing environment, in accordance with some embodiments. In FIG. 2, memory space 200 depicts various memory addressing spaces, or simply "address spaces" for various virtualization layers included in information handling system 100 (see FIG. 1). As shown in FIG. 2, memory space 200 includes physical memory address space (A4) 240 for addressing physical memory. For example, in information handling system 100, processor subsystem 120 may access memory subsystem 130, which may provide physical memory address space (A4) 240. Since hypervisor 104 executes on physical computing resources, hypervisor virtual address space (A3) 230 represents a virtual address space that is based on physical memory address space (A4) 240. A virtual address space enables addressing of larger memory spaces with a limited amount of physical memory and may rely upon an external storage resource (not shown in FIG. 2) for offloading or caching operations. Hypervisor virtual address space (A3) 230 represents an internal address space used by hypervisor 104.

Hypervisor 104 may further generate so-called "physical" address spaces within hypervisor virtual address space (A3) 230 and present these "physical" address space to virtual machines 105 and virtualized storage appliance 110 for virtualized execution. From the perspective of virtual machines 105 and virtualized storage appliance 110, the "physical" address space provided by hypervisor 104 may appear as a real physical memory space. As shown, guest OS "physical" address space (A2) 210 and virtualized storage appliance "physical" address space (A2) 220 represent the "physical" address space provided by hypervisor 104 to guest OS 108 and virtualized storage appliance 110, respectively. Finally, guest OS virtual address space (A1) 212 represents a virtual address space that guest OS 108 implements using guest OS "physical" address space (A2) 210. Virtualized storage appliance virtual address space (A1) 222 represents a virtual address space that virtualized storage appliance 110 implements using virtualized storage appliance "physical" address space (A2) 220.

It is noted that the labels A1, A2, A3, and A4 refer to specific hierarchical levels of real or virtualized memory spaces, as described above, with respect to information handling system 100.

In at least some embodiments, the virtualized information handling systems described herein may include an architectural data mover that is configurable as a PCIe physical function or virtual function and may support inline XOR copying, among other operations. In at least some embodiments, these architectural data movers can be assigned to guest virtual appliances that implement a storage or RAID stack. The architectural data movers may be able to operate using guest virtual addresses, guest physical addresses, host physical addresses, and host virtual addresses for various data operations. In some embodiments, the architectural data mover may be implemented in the processor subsystem but may offload memory-to-memory copy operations from the main processor core(s).

Figure 3:
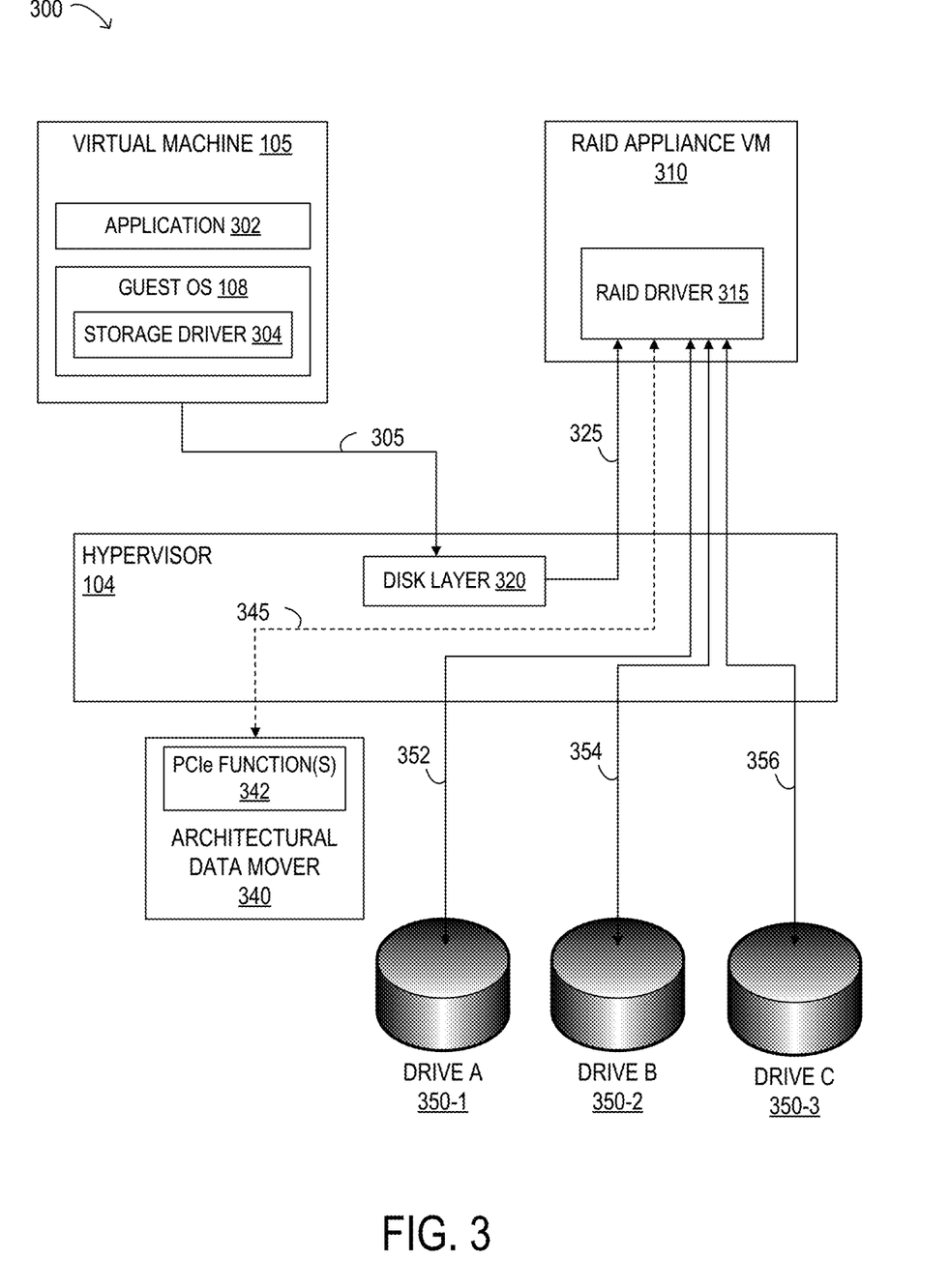
FIG. 3 is a block diagram of selected elements of an information handling system including an architectural data mover to accelerate RAID XOR operations, in accordance with some embodiments.

FIG. 3 is a block diagram of selected elements of an information handling system 300 including an architectural data mover to accelerate RAID XOR operations, in accordance with some embodiments. Information handling system 300 may be an embodiment of information handling system 100 illustrated in FIG. 1. As shown, information handling system 300 includes further details regarding the operation and use of architectural data mover 340, while other elements shown in information handling system 100 have been omitted from FIG. 3 for descriptive clarity. In FIG. 3, for example, virtual machine 105 and guest OS 108 are shown in singular, though they may represent any number of instances of virtual machine 105 and guest OS 108. In the illustrated example, a virtualized storage appliance is shown as RAID appliance VM 310. This RAID appliance VM 310 owns a RAID system including disk drives shown as drive A (350-1), drive B (350-2), and drive 3 (350-3).

In FIG. 3, virtual machine 105 is shown executing application 302 and guest OS 108 under which storage driver 304 is installed and loaded. Storage driver 304 enables virtual machine 105 to access storage resources via disk layer 320 of hypervisor 104. For example, in at least some embodiments, disk I/O operations 305 initiated by storage driver 304 may be directed to disk layer 320, which may redirect them to RAID appliance VM as disk I/O operations 325. In various embodiments, disk layer 320 may include an I/O stack, virtual file system, hypervisor (HV) storage driver, and/or HV network integrated controller (NIC) driver, among other elements, which are loaded into hypervisor 104. In the example embodiment illustrated in FIG. 3, RAID appliance VM 310 is shown including RAID driver 315. In this example, RAID driver 315 operates in the virtual and physical address spaces of RAID appliance VM 310.

In at least some embodiments, RAID appliance VM 310 may interact with architectural data mover 340 using RAID driver 315. In some embodiments, architectural data mover 340 may be implemented within a host processor subsystem (not shown) as a PCIe-configurable device. For example, a PCIe driver in the host processor subsystem may attach to the architectural data mover 340, after which it may be programmed by the host processor like other PCIe devices and may appear, at 345, as a memory/storage resource to RAID appliance VM 310. In other embodiments, architectural data mover 340 may be implemented outside the host processor subsystem, such as in a field programmable gate array (FPGA), application-specific integrated circuit (ASIC), or graphics progressing unit (GPU) that is programmable by the host processor subsystem. In FIG. 3, RAID driver 314 may represent a "back-end" driver of hypervisor 104 that enables RAID appliance VM 310 to access and provide access to storage resources of the RAID system, such as drive A (350-1), drive B (350-2), and drive C (350-3), shown at 352, 354, and 356, respectively.

In FIG. 3, architectural data mover 340 is shown including multiple PCIe functions 342. For example, one PCIe function 342 may be assigned to a host processor subsystem (not shown), one PCIe function 342 may be assigned to hypervisor 104, and other PCIe functions 342 may be assigned to respective virtual machines including, but not limited to, virtual machine 105 and RAID appliance VM 310. In various embodiments, architectural data mover 340 may include a DMA engine, address translator, data processor, and memory media for buffers or other types of local storage, which are omitted from FIG. 3 for descriptive clarity. For example, in some embodiments, a DMA engine within architectural data mover 340 may support scatter-gather or memory-to-memory types of access. An address translator may perform address translations for data transfers and may maintain a local address translation cache. A data processor within architectural data mover 340 may provide general data processing functionality that includes processing of data during data transfer operations, and may include, or have access to, memory included with architectural data mover 340. To a host of architectural data mover 340, such as hypervisor 104, architectural data mover 340 may appear as two independent PCIe devices, e.g., two PCIe endpoints. Thus, hypervisor 104 may be unaware of, and may not have access to, local processing and data transfer that occurs via architectural data mover 340, including DMA operations and programmed I/O operations.

Figure 4A:
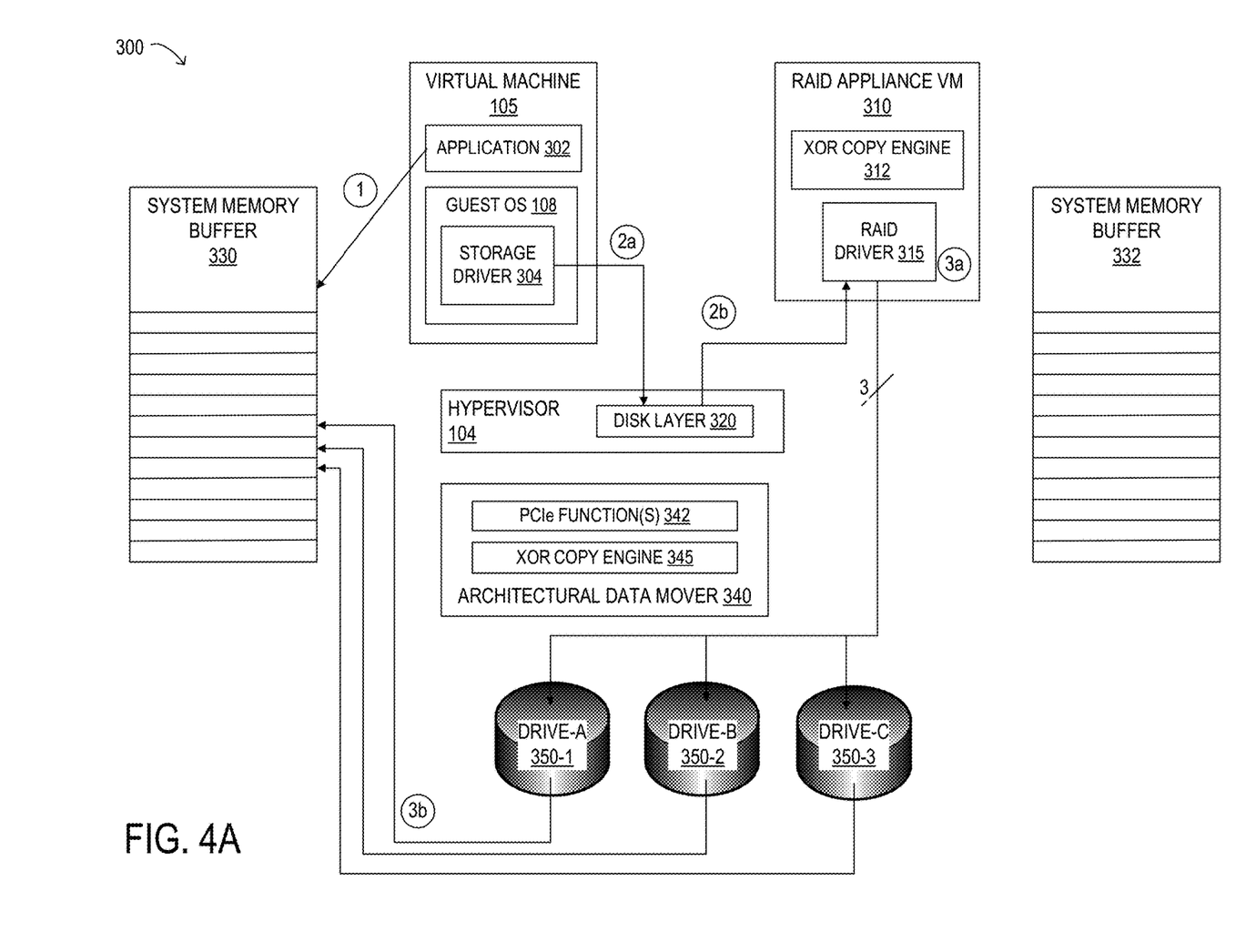
FIGS. 4A and 4B illustrate the operation of an architectural data mover to accelerate RAID XOR operations, as described herein.
Figure 4B:
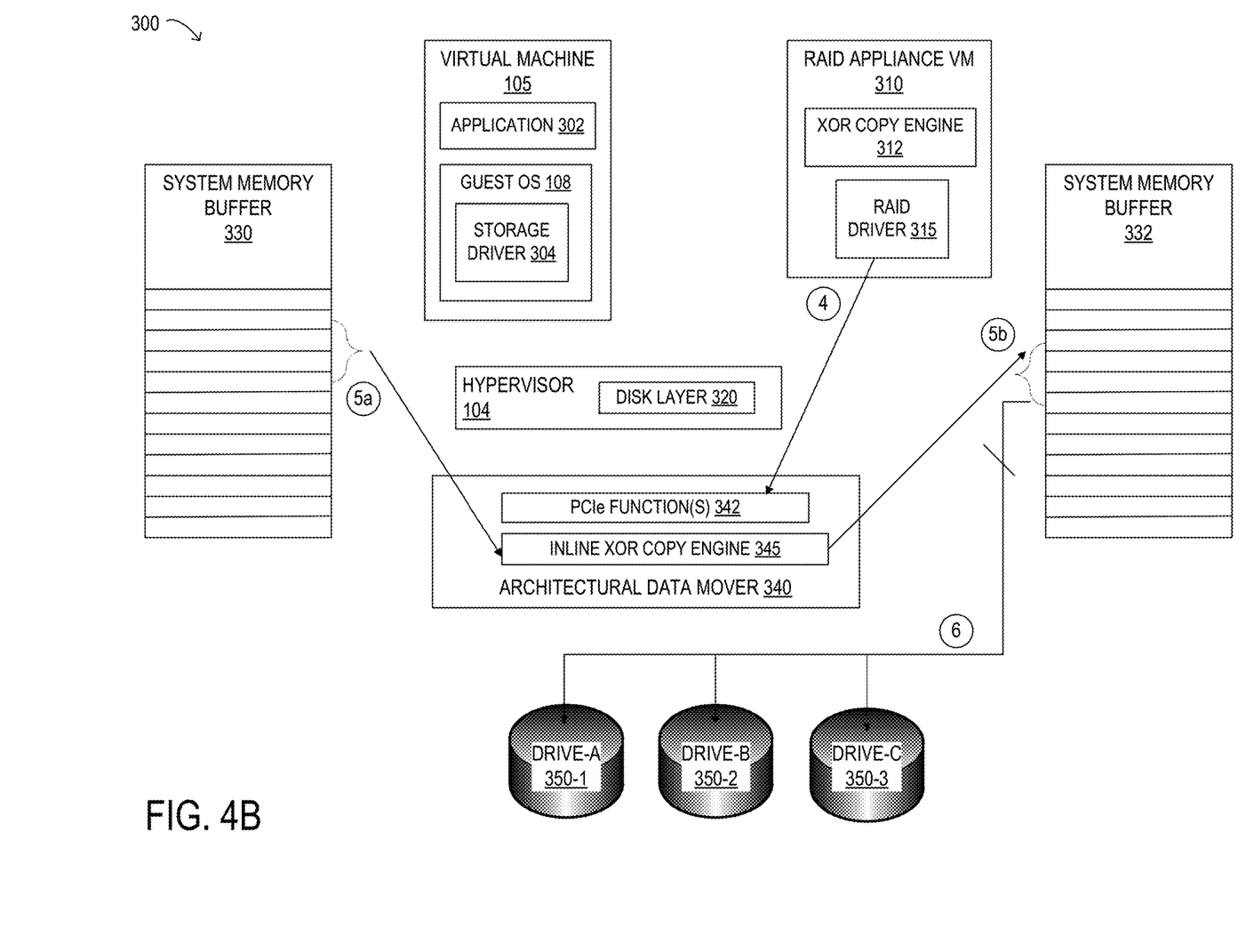

FIGS. 4A and 4B illustrate the operation of an architectural data mover to accelerate RAID XOR operations in information handling system 300, according to some embodiments. In the illustrated embodiment, at (1) in FIG. 4A, application 302 writes new data that is ultimately to be written to the storage drives 350 of the RAID system to a portion of a first system memory buffer 330. At (2a), the application, through storage driver 304, submits to the disk layer 320 of hypervisor 104, a request for an I/O operation to write the new data to the RAID system. At (2b), the disk layer 320 redirects the request to RAID appliance VM 310, which implements the RAID stack and owns the storage drives 350 of the RAID system. In some embodiments, a data mover (e.g., architectural data mover 340 or an alternate data mover) may be employed to move the new data to from the guest OS physical address space to the VSA physical address space. In some embodiments, at (3a), the RAID driver 315 may prepare the new data for writing to the RAID system at target addresses in the physical address space of the VSA, e.g., by partitioning, into a buffer list, the new data into multiple data chunks to be written to respective ones of the disk drives 350 in accordance with a data striping scheme defined by an applicable redundancy policy.

At (3b), the RAID stack may read the old data at the target addresses and old parity information associated with the old data from the drives 350 into another portion of the first system memory buffer 330. For example, the RAID driver 315 may read a first data stripe of the old data from drive A (350-1), a second data stripe of the old data from drive B (350-2) and the old parity information from drive C (350-3). In some embodiments, information handling system 300 may include an I/O accelerator device (not shown) that is programmed by RAID appliance VM 310 to provide managed access to local and remote storage resources. The I/O accelerator device may utilize direct memory access (DMA) for storage operations to and from guest OS 108 in virtual machine 105. Direct memory access involves the transfer of data to/from system memory without significant involvement by a processor subsystem, thereby improving data throughput and reducing a workload of the processor subsystem in the information handling system. In some embodiments, the I/O accelerator device may be used by RAID driver 315 executing in RAID appliance VM 310 to copy the old data and old parity information from the RAID drives 350 to the first system memory buffer 330. In some embodiments, the I/O accelerator device may be or include an FPGA accelerator.

As shown in FIG. 4B, at (4), the processor subsystem may, through RAID driver 315, instruct the architectural data mover 340 to perform inline XOR copying of the new data and associated parity information, in the VSA physical address space. For example, at (5a), the old data, old parity information, and new data stored in system memory buffer 330 may be provided to architectural data mover 340, which performs inline exclusive-or (XOR) copy operations to compute a difference between the old data and the new data, write the difference into a second system memory buffer 332, compute new parity information based on the computed difference between the old data and the new data, and write the new parity information into the second system memory buffer 332, as in (5b). At (6), the RAID driver 315 may write the new data and the new parity information from system memory buffer 332 to the drives 350 in accordance with the applicable redundancy policy. For example, according to a data striping scheme defined by the applicable redundancy policy, RAID driver 315 may write a first stripe of the new data to drive A (350-1), a second stripe of the new data to drive B (350-2), and the new parity information to drive C (350-3). Note that while some of the examples described herein assume a particular data striping scheme associated with RAID level 5, in other embodiments, other striping schemes may be applied by a RAID driver when writing data to a RAID system on behalf of an application executing in a guest OS.

Figure 5:
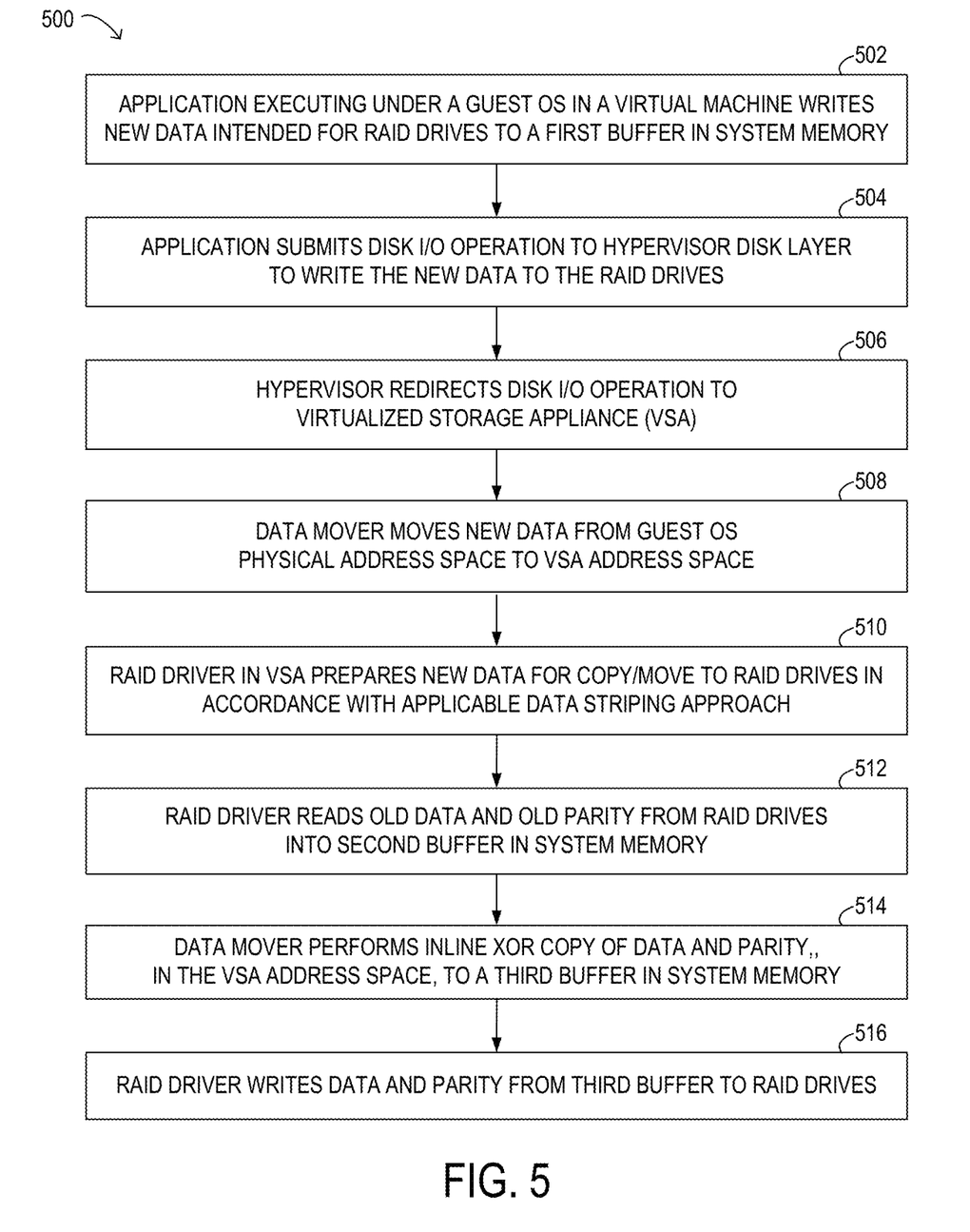
FIG. 5 is flowchart depicting selected elements of an embodiment of a method for accelerating data transfer operations in a virtualized storage appliance using an architectural data mover, as described herein.

Referring now to FIG. 5, a block diagram of selected elements of an embodiment of method 500 for accelerating data transfer operations in a virtualized storage appliance using an architectural data mover, as described herein, is depicted in flowchart form. Method 500 may be performed using information handling system 100 (see FIG. 1) or information handling system 300 (see FIGS. 3, 4A and 4B). It is noted that certain operations described in method 500 may be optional or may be rearranged in different embodiments.

In FIG. 5, method 500 may begin when an application executing under a guest OS in a virtual machine writes new data intended for RAID drives to a first buffer in system memory, as in 502.

At 504, method 500 may include the application submitting a disk I/O operation to the hypervisor disk layer to write the new data to the RAID drives.

At 506, the method may include the hypervisor redirecting the disk I/O operation to a virtualized storage appliance (VSA) For example, the hypervisor may redirect the disk I/O operation to a RAID appliance VM that implements the RAID stack and owns the storage drives of the RAID system.

At 508, method 500 may include the data mover moving the new data from guest OS physical address space to VSA address space.

At 510, the method may include the RAID driver in the VSA preparing the new data for an operation to copy and move the new data to the RAID drives in accordance with an applicable data striping approach. This may include partitioning the new data into multiple data chunks in a buffer list for subsequent XOR copying and distribution across respective RAID drives according to the applicable data striping approach. For example, in some embodiments, the RAID system may implement the RAID 5 data striping scheme, which includes block-level striping and distributed parity information.

At 512, method 500 may include the RAID driver reading old data and old parity information from the target RAID drives into a second buffer in system memory. In some embodiments, the RAID driver may employ an I/O accelerator in the I/O subsystem, such as an FPGA accelerator, to accelerate the copying of the old data and the old parity information into the second buffer.

At 514, the method may include a data mover performing inline XOR copying of data and parity information, in the VSA address space, to a third buffer in system memory. In some embodiments, the data mover may be an architectural data mover that also performed the operation shown at 508. In other embodiments, the data mover may be an architectural data mover that is distinct from the data mover that performed the operation shown at 508.

At 516, the method may include the RAID driver writing data and parity information from the third buffer to the target RAID drives, in accordance with the applicable striping approach.

As described in detail herein, disclosed methods and systems for input/output acceleration in a virtualized storage appliance may provide technical benefits over existing systems and methods. In at least some embodiments, unlike in existing systems in which the processor subsystem must wait for blocking synchronous CPU XOR instructions to be completed, in the systems described herein, the programming model for XOR copy operations may be asynchronous. For example, the RAID driver may program the architectural data mover to perform a batch of XOR copy operations to transfer new data and new parity information to the RAID drives when the XOR copy operation completes. Unlike in existing systems, a RAID storage appliance, and a RAID driver thereof, may be implemented in a virtual machine. In addition, the architectural data movers described herein are not restricted to operating on system physical addresses but may also operate in a guest OS physical address space.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for input/output acceleration in a virtualized information handling system, comprising:
    receiving, at a disk layer of a hypervisor executing in the virtualized information handling system from an application executing under a guest operating system (OS) in a virtual machine, a request to write new data to a redundant array of independent disks (RAID) system comprising a plurality of disk drives;
    redirecting the request to a virtualized storage appliance (VSA) that owns the plurality of disk drives;
    moving the new data from a physical address space of the guest OS to a physical address space of the virtualized storage appliance;
    preparing, by a RAID driver in the virtualized storage appliance, the new data for writing to the RAID system at target addresses in the physical address space of the virtualized storage appliance in accordance with an applicable redundancy policy;
    reading, by the RAID driver into a first buffer in a system memory of the virtualized information handling system, old data stored at the target addresses and old parity information associated with the old data;
    performing, by an architectural data mover associated with a processor subsystem of the virtualized information handling system, inline exclusive-or (XOR) copy operations to compute a difference between the old data stored in the first buffer and the new data, write the difference into a second buffer in the system memory, compute new parity information based on the difference, and write the new parity information into the second buffer;
    writing, by the RAID driver, the difference and the new parity information from the second buffer to the RAID system at the target addresses in the physical address space of the virtualized storage appliance in accordance with the applicable redundancy policy.

2. The method of claim 1, wherein:
    the method further comprises, prior to receiving the request, writing the new data to a third buffer in the system memory; and
    the inline exclusive-or (XOR) copy operations are performed using the new data stored in the third buffer and the old data stored in the first buffer.

3. The method of claim 1, wherein preparing the new data for writing to the RAID system comprises partitioning the new data into multiple data chunks to be written to respective ones of the plurality of disk drives in accordance with a data striping scheme defined by the applicable redundancy policy.

4. The method of claim 1, wherein:
    the architectural data mover is a Peripheral Component Interconnect Express (PCIe) device attached to the processor subsystem using a PCIe driver; and
    the method further comprises receiving, by the architectural data mover from the processor subsystem, an instruction to initiate performance of the inline exclusive-or (XOR) copy operations.

5. The method of claim 1, wherein the architectural data mover resides in the processor subsystem and performs the inline exclusive-or (XOR) copy operations asynchronously and without processor intervention following initiation of the inline exclusive-or (XOR) copy operations by the processor subsystem.

6. The method of claim 1, wherein the architectural data mover resides outside the processor subsystem and comprises a field programmable gate array (FPGA), application-specific integrated circuit (ASIC), or graphics progressing unit (GPU) programmable by the processor subsystem.

7. The method of claim 1, wherein the architectural data mover is configured to move data between any two of a virtual address space of the guest OS, the physical address space of the guest OS, a virtual address space of the virtual machine, a physical address space of the virtual machine, a virtual address space of the hypervisor, a physical address space of the hypervisor, a virtual address space of the VSA, and the physical address space of the VSA.

8. The method of claim 1, wherein the architectural data mover is a Peripheral Component Interconnect Express (PCIe) device comprising respective PCIe functions assigned to two or more of the processor subsystem, the hypervisor, the virtual machine, and the virtualized storage appliance.

9. The method of claim 1, wherein the applicable redundancy policy defines a data striping scheme including block-level striping of data across multiple ones of the plurality of disk drives and a distribution of parity information across multiple ones of the plurality of disk drives.

10. The method of claim 1, wherein moving the new data from the physical address space of the guest OS to the physical address space of the virtualized storage appliance is performed by the architectural data mover or by an alternate data mover.

11. An information handling system, comprising:
    a processor subsystem; and
    a memory subsystem storing program instructions executable by the processor subsystem to implement:
        a virtual machine on which an application executes under a guest operating system (OS);
        a virtualized storage appliance that owns a plurality of disk drives of a redundant array of independent disks (RAID) system;
        a hypervisor configured to:
            receive, at a disk layer of the hypervisor from the application, a request to write new data to the RAID system; and
            redirect the request to the virtualized storage appliance;
        a RAID driver in the virtualized storage appliance configured to:
            prepare the new data for writing to the RAID system at target addresses in the physical address space of the virtualized storage appliance in accordance with an applicable redundancy policy; and
            read into a first buffer in the memory subsystem, old data stored at the target addresses and old parity information associated with the old data; and
        an architectural data mover associated with the processor subsystem and configured to perform inline exclusive-or (XOR) copy operations to compute a difference between the old data stored at the target addresses and the new data, write the difference into a second buffer in the memory subsystem, compute new parity information based on the difference, and write the new parity information into the second buffer;

wherein the RAID driver is further configured to write the difference and the new parity information from the second buffer to the RAID system at the target addresses in the physical address space of the virtualized storage appliance in accordance with the applicable redundancy policy.

12. The information handling system of claim 11, wherein:
the application is configured to write the new data to a third buffer in the memory subsystem prior to the hypervisor receiving the request; and
the inline exclusive-or (XOR) copy operations are performed using the new data stored in the third buffer and the old data stored in the first buffer.

13. The information handling system of claim 11, wherein to prepare the new data for writing to the RAID system, the RAID driver is configured to partition the new data into multiple data chunks to be written to respective ones of the plurality of disk drives in accordance with a data striping scheme defined by the applicable redundancy policy.

14. The information handling system of claim 11, wherein:
the architectural data mover is a Peripheral Component Interconnect Express (PCIe) device attached to the processor subsystem using a PCIe driver; and
the architectural data mover is further configured to receive, from the processor subsystem, an instruction to initiate performance of the inline exclusive-or (XOR) copy operations.

15. The information handling system of claim 11, wherein the architectural data mover resides in the processor subsystem and is configured to perform the inline exclusive-or (XOR) copy operations asynchronously and without processor intervention following initiation of the inline exclusive-or (XOR) copy operations by the processor subsystem.

16. The information handling system of claim 11, wherein the architectural data mover resides outside the processor subsystem and comprises a field programmable gate array (FPGA), application-specific integrated circuit (ASIC), or graphics progressing unit (GPU) programmable by the processor subsystem.

17. The information handling system of claim 11, wherein the architectural data mover is configured to move data between any two of a virtual address space of the guest OS, the physical address space of the guest OS, a virtual address space of the virtual machine, a physical address space of the virtual machine, a virtual address space of the hypervisor, a physical address space of the hypervisor, a virtual address space of the VSA, and the physical address space of the VSA.

18. The information handling system of claim 11, wherein the architectural data mover is a Peripheral Component Interconnect Express (PCIe) device comprising respective PCIe functions assigned to two or more of the processor subsystem, the hypervisor, the virtual machine, and the virtualized storage appliance.

19. The information handling system of claim 11, wherein the applicable redundancy policy defines a data striping scheme that includes block-level striping of data across multiple ones of the plurality of disk drives and a distribution of parity information across multiple ones of the plurality of disk drives.

20. The information handling system of claim 11, further comprising an input/output accelerator implemented in a field programmable gate array (FPGA) and configured to accelerate reading the old data stored at the target addresses and the old parity information associated with the old data into the first buffer.

* * * * *